United States Patent Office 3,299,058
Patented Jan. 17, 1967

3,299,058
4-AMINO-3,4-DIHYDRO-2H-PYRAN-2-ONES
James C. Martin, Kingsport, Tenn., assignor to Eastman Kodak Company, Rochester, N.Y., a corporation of New Jersey
No Drawing. Filed Nov. 25, 1964, Ser. No. 413,992
11 Claims. (Cl. 260—247.2)

This invention relates to novel chemical compounds and their preparation and more particularly to the novel 4-amino-3,4-dihydro-2H-pyran-2-ones of the formula:

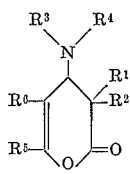

In the above formula for the compounds of my invention, the substituents $R^1$ and $R^2$, when taken singly, can be the same or different and can be alkyl of 1 to about 8 carbon atoms, aralkyl of 7 to about 12 carbon atoms and aryl, i.e., substituted or unsubstituted aryl, of 6 to about 12 carbon atoms and, when taken collectively with the carbon atom to which they are attached, can represent a saturated carbocyclic ring having 4 to 7 ring carbon atoms. The substituents $R^3$ and $R^4$, when taken singly, can be the same or different and can be alkyl of 1 to about 8 carbon atoms, or aryl, i.e., substituted or unsubstituted aryl, of 6 to about 12 carbon atoms and, when taken collectively with the nitrogen atom to which they are attached, represent a heterocyclic ring having 4 to about 7 ring atoms. $R^5$ can be alkyl or aryl, i.e., substituted or unsubstituted aryl, and $R^6$ can be hydrogen, alkyl or aryl, i.e., substituted or unsubstituted aryl.

$R^1$ and $R^2$, when alkyl, are typically straight or branched chain alkyl such as methyl, ethyl, propyl, isopropyl, butyl, sec-butyl, tert-butyl, isobutyl, pentyl, hexyl, heptyl, octyl, 2-ethylhexyl, etc., and are preferably lower alkyl, e.g., alkyl of 1 to about 4 carbon atoms. When $R^1$ and $R^2$ are aralkyl, they are typically groups such as benzyl; 2-methylbenzyl; 3-methylbenzyl; 4-methylbenzyl; 2,3,4,5,6-pentamethylbenzyl; 2,4-diethylbenzyl; 2-ethyl-4-propylbenzyl; etc. and are preferably such groups containing 7 to 9 carbon atoms.

$R^1$ and $R^2$, when substituted or unsubstituted aryl, are exemplified by groups such as phenyl, p-tolyl, o-tolyl, m-tolyl, o-chlorophenyl, m-bromophenyl, 4-carbethoxyphenyl, 3,5-dipropylphenyl, 4-hexylphenyl, etc., and are preferably such groups containing 6 to 9 carbon atoms.

$R^1$ and $R^2$, when taken collectively with the carbon atom to which they are attached to represent a carbocyclic ring of 4 to 7 ring carbon atoms, typically represent groups such as cyclobutylene, cyclopentylene, cyclohexylene, cycloheptylene, etc., and preferably represent such rings containing about 5 to about 6 ring carbon atoms.

$R^3$ and $R^4$, when alkyl of 1 to about 8 carbon atoms, are typically groups such as methyl, ethyl, propyl, isopropyl, butyl, sec-butyl, tert-butyl, isobutyl, pentyl, hexyl, heptyl, octyl, 2-ethylhexyl, etc., and are preferably lower alkyl, and when aryl, are substituents such as phenyl, o-tolyl, m-tolyl, p-tolyl, 3,5-dipropylphenyl, 4-hexylphenyl, etc., and are preferably such aryl groups having 6 to 9 carbon atoms.

$R^3$ and $R^4$, when taken collectively with the nitrogen atom to which they are attached to represent a heterocyclic group of 4 to about 7 ring atoms, typically represent groups such as azetidino, pyrrolidinyl, piperidino, 4-methylpiperidino, hexahydroazepino, morpholino, thiamorpholino, etc., and are preferably such groups containing 5 to 6 ring atoms.

$R^5$ can be alkyl or substituted or unsubstituted aryl such as methyl, ethyl, propyl, isopropyl, butyl, sec-butyl, tert-butyl, isobutyl, pentyl, hexyl, heptyl, phenyl, o-tolyl, m-tolyl, p-tolyl, xylyl, etc. $R^5$, when akyl, is preferably lower alkyl and, when aryl, is preferably aryl of 6 to about 9 carbon atoms. $R^6$, when alkyl or aryl, can be the same as $R^5$ and is preferably hydrogen, lower alkyl or aryl of 6 to 9 carbon atoms.

My novel compounds can be prepared by contacting a ketoketene and an aminovinyl ketone. Preferably, the reaction is carried out at a temperature of about 0° C. to about 180° C., although higher or lower temperatures can be used. Preferably equimolar quantities of the reactants are employed for reasons of economy. However, a stoichiometric excess of either the ketoketene or the aminovinyl ketone can be employed and is often desirable.

The reaction can be carried out with or without a solvent. Suitable solvents are those in which each of the reactants are soluble but which react with neither the ketoketene nor the aminovinyl ketone. Examples of useful solvents include ethers, esters, aromatic and aliphatic hydrocarbons, chlorinated hydrocarbons, nitriles, and certain dipolar aprotic solvents such as dimethyl formamide, dimethyl sulfoxide, propylene carbonate, tetramethylene sulfone, etc.

The reaction is preferably carried out at atmospheric pressure for reasons of convenience and economy. However, subatmospheric or superatmospheric pressures can be used.

The process of the invention can be represented by the following equation:

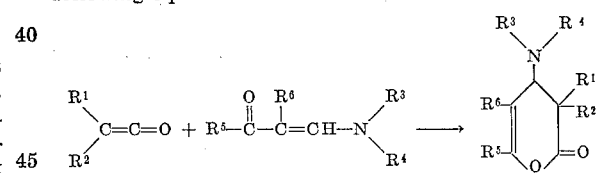

In the formulae in the above equation, the substituents $R^1$, $R^2$, $R^3$, $R^4$, $R^5$ and $R^6$ have the meanings hereinbefore assigned.

Examples of the ketoketenes of the formula

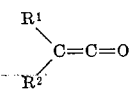

that are useful in the process of my invention include compounds such as dimethylketene, diethylketene, methylpropylketene, butylethylketene, isobutylethylketene, dibutylketene, dihexylketene, dioctylketene, diphenylketene, ethylphenylketene, dibenzylketene, tetramethyleneketene, pentamethyleneketene, etc. These compounds can be prepared by the procedures described by Hanford and Sauer in "Organic Reactions," vol. III, Roger Adams, Editor, John Wiley and Sons, Inc., New York, 1946, pp. 108–140.

Suitable aminovinyl ketones for use in the process of my invention are compounds such as 1-dimethylamino-4-methyl-1-penten-3-one;
1-(N-methylanilino)-4-methyl-1-penten-3-one;
1(n-dodecylamino)-4-methyl-1-penten-3-one;
1-(p-methoxyanilino)-4-methyl-1-penten-3-one;
2-ethyl-4-methyl-1-piperidino-1-hexen-3-one;
2,4-diethyl-1-piperidino-1-hexen-3-one;
2,4-diethyl-1-piperidino-octen-3-one;
2-ethyl-4,4-diphenyl-1-piperidino-1-buten-3-one;
2-ethyl-4-methyl-1-pyrrolidino-1-penten-3-one;
2-ethyl-4-methyl-1-dibutylamino-1-penten-3-one;
2-ethyl-1-piperidino-1-buten-3-one;
1-morpholino-2-pentyl-1-buten-3-one; etc.

The aminovinyl ketones for use in the process of my invention can be prepared by the method disclosed by Hasek and Martin, J. Org. Chem., 28, 1468 (1963).

The compounds of my invention are useful as plasticizers for vinyl and cellulosic resins. The plasticized resinous compositions can be prepared by conventional methods, e.g., by milling the resin and plasticizer together on heated rolls.

The following examples illustrate the compounds and process of my invention.

Example 1

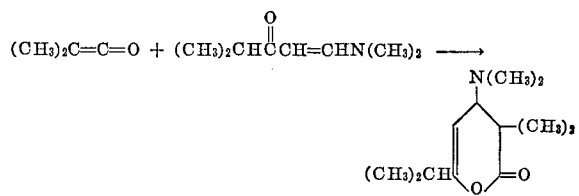

Dimethylketene (140 g., 2.0 moles) was added over a 30 min. period to a stirred solution of 1-dimethylamino-4-methyl-1-penten-3-one in 300 ml. of benzene. The temperature of the exothermic reaction was kept at 20–30° by a cooling bath. After stirring for 2 hr., the reaction solution was distilled through a 10-in. packed column to give 360.1 g. (86%) of 4-dimethylamino-3,4-dihydro-6-isopropyl-3,3-dimethyl-2H-pyran-2-one, B.P. 79° (1 mm.), $n_D^{20}$ 1.4733.

*Analysis.*—Calcd. for $C_{12}H_{21}NO_2$: C, 68.2; H, 10.0; N, 6.6. Found: C, 67.8; H, 9.9; N, 6.5.

The n-m-r spectrum as determined on a Varian A–60 instrument, with values reported in parts per million with reference to tetramethylsilane as an internal standard, showed a doublet at 1.20 and a septet at 2.50 (isopropyl groups), singlets at 1.25 and 1.29 (methyl groups), a singlet at 2.19 (dimethylamino group), and doublets at 2.98 (methine proton and 5.14) (olefinic proton).

Example 2

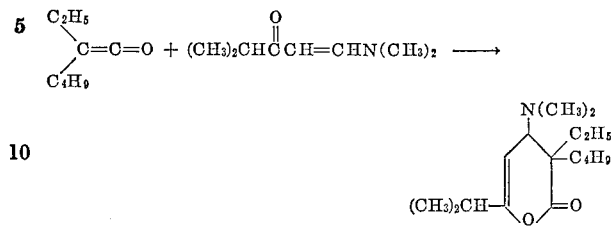

A solution of 31.4 g. (0.25 mole) of butylethylketene and 35.2 g. (0.25 mole) of 1-dimethylamino-4-methyl-1-penten-3-one in 200 ml. of toluene was refluxed for 8 hr. Distillation through a 10-inch packed column gave 34.4 g. (52%) of 3-butyl-4-dimethylamino-3-ethyl-3,4-dihydro-6-isopropyl-2H-pyran-2-one, B.P. 110–113° (1.5 mm.).

*Analysis.*—Calcd. for $C_{16}H_{29}NO_2$: C, 71.9; H, 10.9; N, 5.2. Found: C, 71.7; H, 11.0; N, 5.2.

Example 3

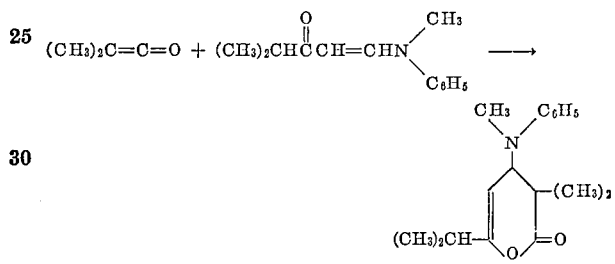

Dimethylketene, (21.0 g., 0.3 mole) was added over a period of 5 min. to a stirred solution of 60.9 g. (0.3 mole) of 1-(N-methylanilino)-4-methyl-1-penten-3-one in 200 ml. of benzene. The reaction was slowly exothermic but was held at 28–30° by a water bath for 6 hrs. Distillation of the reaction solution gave 62.1 g. of distillate, B.P. 131–136° (0.2 mm.). The n-m-r spectrum indicated this material was a mixture of about 25% of the starting 1-(N-methylanilino)-4-methyl-1-penten-3-one and 75% of the desired product, 3,4-dihydro-6-isopropyl-3,3-dimethyl-4-(N-methylanilino)-2H-pyran-2-one.

Example 4

Under the general conditions of Example 2, the following ketenes and aminovinyl ketones give the products shown:

| Ketene | Aminovinyl Ketone | Product |
|---|---|---|
| $(C_6H_5)_2C=C=O$ | $(C_2H_5)_2CHCOCH=CHN{\bigcirc}$ | (structure: piperidino-substituted pyranone with $(C_6H_5)_2$ and $(C_2H_5)_2CH$ groups) |

| Ketene | Aminovinyl Ketone | Product |
|---|---|---|
| $(C_2H_5)_2C=C=O$ | $CH_3\overset{O}{\underset{\underset{C_3H_7}{\mid}}{C}}C=CHN\diagup\diagdown O$ | (morpholino-substituted pyranone with $C_3H_7$, $(C_2H_5)_2$, $CH_3$, $=O$) |
| $(C_8H_{17})_2C=C=O$ | $(C_6H_5)_2CH\overset{O}{\underset{\underset{C_2H_5}{\mid}}{C}}{-}C=CHN\diagup\diagdown$ | (pyrrolidino-substituted pyranone with $C_2H_5$, $(C_8H_{17})_2$, $(C_6H_5)_2CH$, $=O$) |
| $(C_6H_5CH_2)_2C=C=O$ | $CH_3\overset{O}{\overset{\|}{C}}CH=CHN(C_4H_9)_2$ | (pyranone with $N(C_4H_9)_2$, $(CH_2C_6H_5)_2$, $CH_3$, $=O$) |
| $\overset{CH_3}{\underset{C_3H_7}{\diagdown\diagup}}C=C=O$ | $C_4H_9\overset{O}{\underset{\underset{C_2H_5}{\mid}}{C}}C=CHN\diagup\diagdown CH_3$ | (4-methylpiperidino-substituted pyranone with $CH_3$, $C_3H_7$, $C_2H_5$, $C_4H_9$, $=O$) |

The following example shows the use of one of the compounds of my invention as a plasticizer for a vinyl resin.

*Example 5*

Fifty parts of 3-butyl-4-dimethylamino-3-ethyl-3,4-dihydro-6-isopropyl-2H-pyran-2-one and fifty parts of polyvinyl chloride are milled together on heated rolls. The resulting resin is quite flexible and tough.

Although the invention has been described in considerable detail with particular reference to certain preferred embodiments thereof, variations and modifications can be effected within the spirit and scope of the invention as described hereinbefore and as defined in the appended claims.

I claim:
1. A 4-amino-3,4-dihydro-2H-pyran-2-one of the formula:

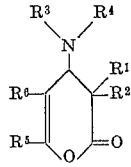

wherein $R^1$ and $R^2$, when taken singly, are selected from the group consisting of:
  (a) alkyl of 1 to 8 carbon atoms,
  (b) benzyl and
  (c) monocarbocyclic aryl of 6 to 9 carbon atoms and, when taken collectively with the carbon atom to which they are attached, represent a saturated carbocyclic ring of 5 to 6 ring carbon atoms; $R^3$ and $R^4$, when taken singly, are selected from the group consisting of:
  (a) alkyl of 1 to 8 carbon atoms and
  (b) monocarbocyclic aryl of 6 to 9 carbon atoms and, when taken collectively with the nitrogen atom to which they are attached, represent a heterocyclic ring selected from the group consisting of azetidino, pyrrolidino, piperidino, 4-methylpiperidino, hexahydroazepino, morpholino and thiamorpholino; $R^5$ is selected from the group consisting of:
  (a) alkyl of 1 to 8 carbon atoms and
  (b) monocarbocyclic aryl of 6 to 9 carbon atoms; and $R^6$ is selected from the group consisting of:
  (a) hydrogen,
  (b) alkyl of 1 to 8 carbon atoms and
  (c) monocarbocyclic aryl of 6 to 9 carbon atoms.

2. 4 - dimethylamino - 3,4 - dihydro-6-isopropyl-3,3-dimethyl - 2H - pyran - 2 - one.

3. 3 - butyl - 4 - dimethylamino - 3 - ethyl - 3,4 - dihydro - 6 - isopropyl - 2H - pyran - 2 - one.

4. 3,4 - dihydro - 6 - isopropyl - 3,3 - dimethyl - 4 - (N-methylanilino) - 2H - pyran - 2 - one.

5. 6 - (2 - ethylpropyl) - 3,4 - dihydro - 3,3 - diphenyl-4 - piperidine - 2H - pyran - 2 - one.

6. 3,3 - diethyl - 3,4 - dihydro - 6 - methyl - 4 - morpholino - 5 - propyl - 2H - pyran - 2 - one.

7. The process which comprises contacting a ketoketene and an aminovinyl ketone and obtaining a 4 - amino-3,4 - dihydro - 2H - pyran - 2 - one.

8. The process which comprises contacting a ketoketene of the formula:

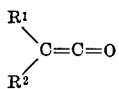

with an aminovinyl ketone of the formula:

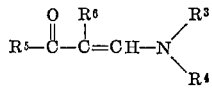

at a temperature of about 0° C. to about 180° C. and obtaining a 4-amino-3,4-dihydro-2H-pyran-2-one of the formula:

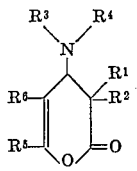

wherein $R^1$ and $R^2$, when taken singly, are selected from the group consisting of:
  (a) alkyl of 1 to about 8 carbon atoms,
  (b) aralkyl of 7 to about 12 carbon atoms and
  (c) aryl of 6 to about 12 carbon atoms and, when taken collectively with the carbon atom to which they are attached, represent a saturated carbocyclic ring of 4 to 7 ring carbon atoms; $R^3$ and $R^4$, when taken singly, are selected from the group consisting of:
  (a) alkyl of 1 to about 8 carbon atoms and
  (b) aryl of 6 to about 12 carbon atoms and, when taken collectively with the nitrogen atom to which they are attached, represent a heterocyclic ring having 4 to about 7 ring atoms; $R^5$ is selected from the group consisting of:
  (a) alkyl of 1 to about 8 carbon atoms and
  (b) aryl of 6 to about 12 carbon atoms and $R^6$ is selected from the group consisting of:
  (a) hydrogen,
  (b) alkyl of 1 to about 8 carbon atoms and
  (c) aryl of 6 to about 12 carbon atoms.

9. The process which comprises contacting dimethylketene with 1-dimethylamino-4-methyl-1-penten-3-one at a temperature of about 0° C. to about 180° C. and obtaining 4 - dimethylamino - 3,4 - dihydro - 6 - isopropyl-3,3-dimethyl-2H-pyran-2-one.

10. The process which comprises contacting butylethylketene with 1-dimethylamino-4-methyl-1-penten-3-one at a temperature of about 0° C. to about 180° C. and obtaining 3-butyl-4-dimethylamino-3-ethyl-3,4-dihydro-6-isopropyl-2H-pyran-2-one.

11. The process which comprises contacting dimethylketene with 1-(N-methylanilino)-4-methyl-1-penten-3-one at a temperature of about 0° C. to about 180° C. and obtaining 3,4 - dihydro - 6 - isopropyl-3,3-dimethyl-4-(N-methylanilino)-2H-pyran-2-one.

No references cited.

ALEX MAZEL, *Primary Examiner.*

HENRY R. JILES, *Examiner.*

JOSE TOVAR, *Assistant Examiner.*